United States Patent
Wang et al.

(10) Patent No.: US 9,866,479 B2
(45) Date of Patent: Jan. 9, 2018

(54) TECHNOLOGIES FOR CONCURRENCY OF CUCKOO HASHING FLOW LOOKUP

(71) Applicant: Intel Corporation, Santa Clara, CA (US)

(72) Inventors: Ren Wang, Portland, OR (US); Dong Zhou, Pittsburgh, PA (US); Bruce Richardson, Sixmilebridge (IE); George W. Kennedy, Hillsboro, OR (US); Christian Maciocco, Portland, OR (US); Sameh Gobriel, Hillsboro, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/750,921

(22) Filed: Jun. 25, 2015

(65) Prior Publication Data

US 2016/0241475 A1     Aug. 18, 2016

Related U.S. Application Data

(60) Provisional application No. 62/115,520, filed on Feb. 12, 2015.

(51) Int. Cl.
*H04L 12/743* (2013.01)
*H04L 12/851* (2013.01)
*H04L 12/819* (2013.01)

(52) U.S. Cl.
CPC ......... *H04L 45/7453* (2013.01); *H04L 47/21* (2013.01); *H04L 47/2483* (2013.01)

(58) Field of Classification Search
CPC .................................................. H04L 45/7453
USPC .......................................................... 370/392
See application file for complete search history.

(56) References Cited

U.S. PATENT DOCUMENTS

| 8,874,842 B1 | 10/2014 | Kimmel et al. |
| 2014/0153571 A1 | 6/2014 | Neugebauer |

FOREIGN PATENT DOCUMENTS

| EP | 2802110 | 11/2014 |

OTHER PUBLICATIONS

European Search Report for European Patent Application No. 16151384.1, dated Mar. 17, 2016 (8 pages).

*Primary Examiner* — Ronald B Abelson
(74) *Attorney, Agent, or Firm* — Barnes & Thornburg LLP

(57) ABSTRACT

Technologies for supporting concurrency of a flow lookup table at a network device. The flow lookup table includes a plurality of candidate buckets that each includes one or more entries. The network device includes a flow lookup table write module configured to perform a displacement operation of a key/value pair to move the key/value pair from one bucket to another bucket via an atomic instruction and increment a version counter associated with the buckets affected by the displacement operation. The network device additionally includes a flow lookup table read module to check the version counters during a lookup operation on the flow lookup table to determine whether a displacement operation is affecting the presently read value of the buckets. Other embodiments are described herein and claimed.

25 Claims, 7 Drawing Sheets

TECHNOLOGIES FOR CONCURRENCY OF CUCKOO HASHING FLOW LOOKUP

CROSS-REFERENCE TO RELATED APPLICATION

The present application claims priority under 35 U.S.C. §119(e) to U.S. Provisional Patent Application Ser. No. 62/115,520, entitled "TECHNOLOGIES FOR CONCURRENCY OF CUCKOO HASHING FLOW LOOKUP," which was filed on Feb. 12, 2015.

BACKGROUND

Modern computing devices have become ubiquitous tools for personal, business, and social uses. As such, many modern computing devices are capable of connecting to various data networks, including the Internet and corporate intranets, to retrieve and transmit/receive data communications over such networks. Oftentimes, a computing device connected to one network needs to communicate with a computing device connected on a different network. To facilitate communications between such computing devices, networks typically include one or more network devices (e.g., a network switch, a network router, etc.) to route communications (i.e., network packets) from one computing device to another based on network flows, which are stored in a flow lookup table. Traditionally, network packet processing (e.g., packet switching) has been performed on dedicated network processors of the network devices.

Network virtualization technologies (e.g., network functions virtualization (NFV)) and centralized controller networking architectures (e.g., software-defined networking (SDN)), and usage requirements thereof, have introduced software based network packet processing. Such software based network packet processing has resulted in network infrastructures that support network packet processing being performed on network devices with general purpose processors, thereby increasing scalability, configurability, and flexibility. Typically, a network packet flow identification library uses a hash table (i.e., the flow lookup table) on which to perform network flow lookups. However, during the hashing process, hash collisions may occur.

One such method, Cuckoo-hashing, has emerged as a memory-efficient, high performance hashing scheme for resolving hash collisions during flow lookup table lookups using data plane libraries and network interface controller drivers of a network packet input/output (I/O) engine (e.g., Intel® Data Plane Development Kit (DPDK)) for fast network packet processing (e.g., flow lookup table lookup, software router/switch functionality, etc.). However, read-write concurrency may be necessary to effectively take advantage of Cuckoo-hashing on the general purpose processors. In other words, when a core of the general purpose processor is updating the flow lookup table, another core of the general purpose processor should be able to perform a flow lookup in parallel, without needing to lock the flow lookup table.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
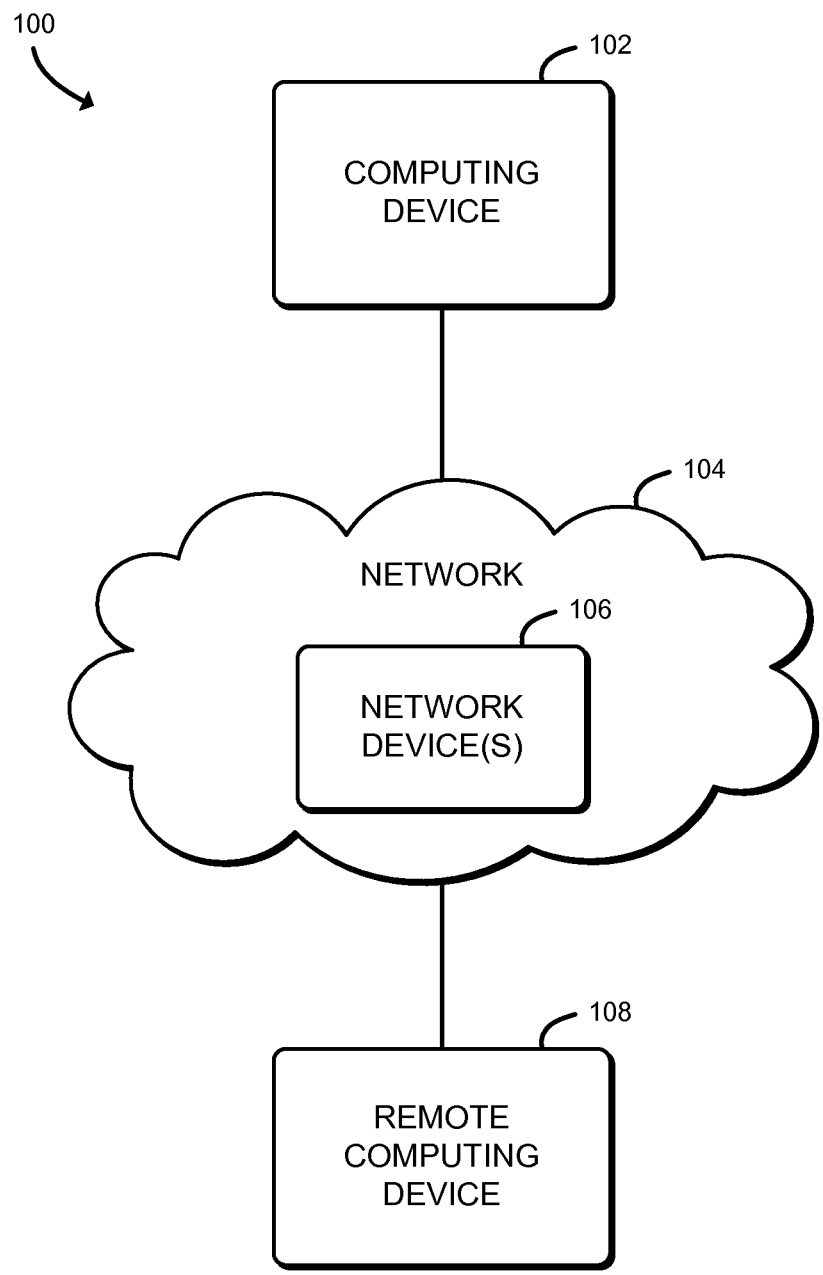
FIG. 1 is a simplified block diagram of at least one embodiment of a system for concurrency of cuckoo-hashing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for concurrency of cuckoo-hashing flow lookups includes a computing device 102 and a remote computing device 108 in communication over a network 104 via one or more network devices 106. The network devices 106 facilitate network communications (i.e., network packets) by processing and routing the network packets from the computing device 102 to the remote computing device 108, and vice versa, over the network 104. For example, the computing device 102 may attempt to transmit data (i.e., a payload of a network packet) encapsulated in one or more network packets to the remote computing device 108. To do so, each network device 106 responsible for processing and routing the network packets does so based on information typically provided within the network packets (e.g., in a header of an internet protocol (IP) network packet).

In use, as described in further detail below, a network device 106 may receive a network packet from a computing device (e.g., the computing device 102, another network device 106, etc.), process the network packet based on policies stored at the network device 106, and forward the network packet to a target computing device (e.g., another network device 106, the remote computing device 108, etc.). To identify the target computing device, the network device 106 performs a hash-based lookup operation on a flow lookup table (i.e., a hash table that maps flow entries to the network flow's next target) to determine a flow for the network packet. To do so, the lookup operation performs a hash on information related to the network packet (e.g., a destination IP address, destination media access control (MAC) address, 5-tuple flow identification, etc.) and uses the result to check against the flow lookup table.

The flow lookup table includes a match field that contains either a specific value that corresponds to a parameter of the network packet, or a value that indicates the flow entry is not included in a particular flow's parameter set. Each hash table entry, or bucket, may include one or more key/value pair, wherein the key identifies some item of data (e.g., a network packet flow identifier) and the value provides a location of the data (e.g., the flow data corresponding to the network packet flow identifier) in another location, such as another table. Additionally, each bucket may support more than one key/value pair. For example, if a hash table is a four-way association table, one bucket can support four key/value pair entries. Additionally, each key may be mapped to more than one bucket. For example, an array of hash functions may be provided such that different buckets can be mapped to a key based on which hash function was applied to the key.

To support read/write concurrency of the flow lookup table, the network device 106 associates a version counter with one or more hash table entries, or buckets, in the flow lookup table, which are incremented each time the associated bucket is modified. Unlike traditional concurrency support methods that require state comparisons of version counters with each lookup operation, using load/store instructions that are written and/or read atomically (e.g., streaming single instruction, multiple data (SIMD) extensions 2 (SSE2) load/store instructions) may ensure a value associated with a found key is valid. As such, performing the version counter state comparison is only be required when the key is not found in its corresponding bucket, thereby reducing the overhead associated with performing the comparison on each lookup.

The computing device 102 may be embodied as any type of computation or computer device capable of performing the functions described herein, including, without limitation, a computer, a desktop computer, a workstation, a laptop computer, a notebook computer, a tablet computer, a mobile computing device, a wearable computing device, a network appliance, a web appliance, a distributed computing system, a processor-based system, and/or a consumer electronic device. Similarly, the remote computing device 108 may be embodied as any type of computation or computer device capable of performing the functions described herein, including, without limitation, a computer, a smartphone, a tablet computer, a laptop computer, a notebook computer, a mobile computing device, a wearable computing device, a multiprocessor system, a server (e.g., stand-alone, rack-mounted, blade, etc.), a network appliance (e.g., physical or virtual), a web appliance, a distributed computing system, a processor-based system, and/or a consumer electronic device. In use, the remote computing device 108 is configured to communicate with the computing device 102 over the network 104 via the network devices 106.

The network 104 may be embodied as any type of wired or wireless communication network, including cellular networks (e.g., Global System for Mobile Communications (GSM)), digital subscriber line (DSL) networks, cable networks, telephony networks, local or wide area networks, global networks (e.g., the Internet), or any combination thereof. The network devices 106 may be embodied as any type of computing device capable of facilitating wired and/or wireless network communications between the computing device 102 and the remote computing device 108. For example, the network devices 106 may be embodied as computers, routers, switches, network hubs, servers, storage devices, compute devices, etc. Additionally, the network 104 may include any number of network devices 106 as needed to facilitate communication between the computing device 102 and the remote computing device 108 through the network 104.

Each of the network devices 106 may be embodied as any type of computation or computer device capable of managing communications and performing the functions described herein, including, without limitation, a general purpose computing device, a network appliance (e.g., physical or virtual), a web appliance, a router, a switch, a multiprocessor system, a server (e.g., stand-alone, rack-mounted, blade, etc.), a distributed computing system, a processor-based system, a desktop computer, a laptop computer, a notebook computer, a tablet computer, a smartphone, a mobile computing device, a wearable computing device, a consumer electronic device, or other computer device. In some embodiments, such as in SDN and/or network functions virtualization (NFV) architectures, one or more of the network devices 106 may run one or more virtual machines (VMs) to implement the physical network functions of the network device 106 in software. In other words, some of the network devices 106 or the functions thereof may be virtualized.

Figure 2:
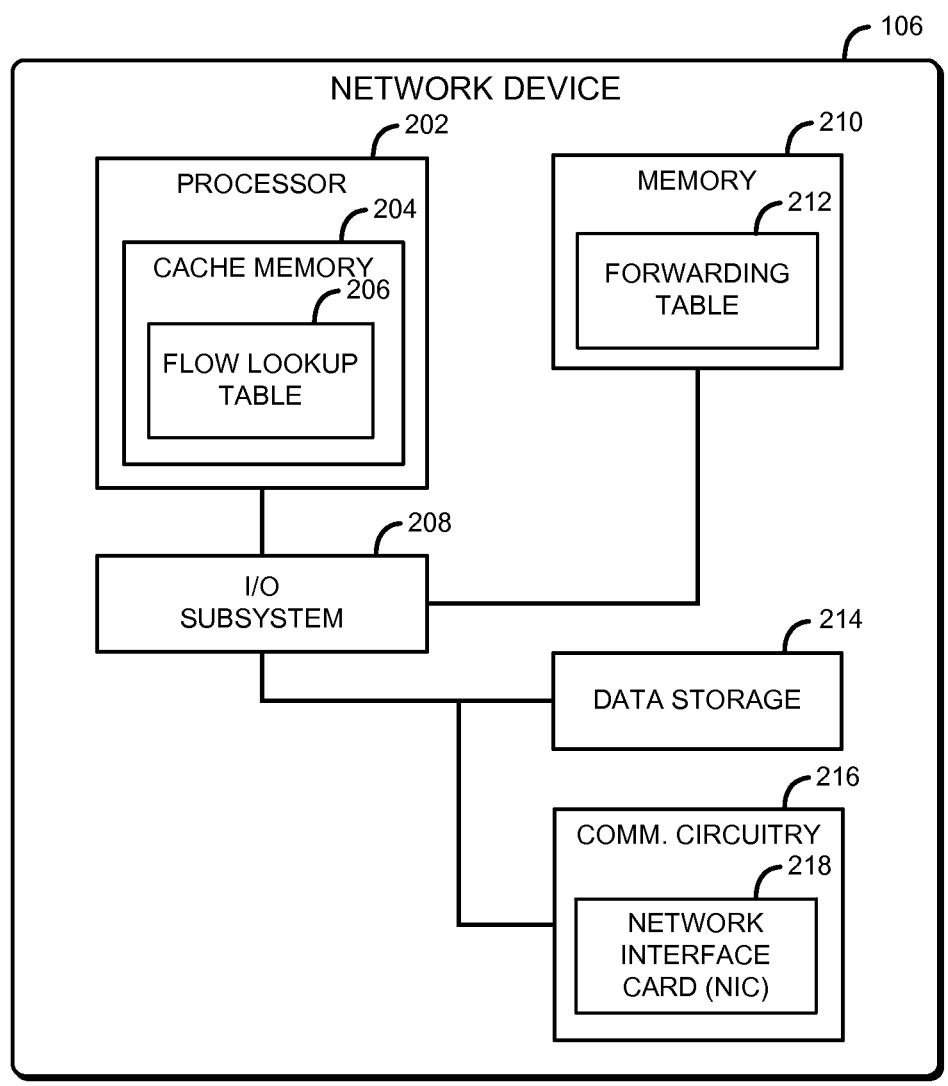
FIG. 2 is a simplified block diagram of at least one embodiment of a network device of the system of FIG. 1.

As shown in FIG. 2, an illustrative network device 106 includes a processor 202, an input/output (I/O) subsystem 208, a memory 210, a data storage device 214, and communication circuitry 216. Of course, in other embodiments, the network device 106 may include alternative or additional components, such as those commonly found in a server, router, switch, or other network device. Additionally, in some embodiments, one or more of the illustrative components may be incorporated in, or otherwise form a portion of, another component. For example, the memory 210, or portions thereof, may be incorporated in one or more processors 202 in some embodiments.

The processor 202 may be embodied as any type of processor capable of performing the functions described herein. The processor 202 may be embodied as a single-core processor or a multi-core processor, multiple processors, a digital signal processor, a microcontroller, a graphics processing unit (GPU), a general purpose GPU (GPGPU), an accelerated processing unit (APU), a field-programmable gate array (FPGA), or other processor or processing/controlling circuit. The memory 210 may be embodied as any type of volatile or non-volatile memory or data storage capable of performing the functions described herein. In operation, the memory 210 may store various data and software used during operation of the network device 106 such as operating systems, applications, programs, libraries, and drivers. The memory 210 is communicatively coupled to the processor 202 via the I/O subsystem 208, which may be embodied as circuitry and/or components to facilitate input/output operations with the processor 202, the memory 210, and other components of the network device 106. For example, the I/O subsystem 208 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 208 may form a portion of a system-on-a-chip (SoC) and be incorporated, along with the processors 202, the memory 210, and other components of the network device 106, on a single integrated circuit chip.

The illustrative network device 106 includes a cache memory 204 that may be embodied as an on-die cache, or an on-processor cache. In some embodiments, the cache memory 204 may be embodied as any type of cache memory that the processor 202 of the computing device 102 can access more quickly than the memory 208. For example, in some embodiments, the cache memory 204 may be an off-die cache, but reside on the same SoC as the processor 202.

In use, as will be described in further detail below, network flow information is written to a flow lookup table 206, which provides mapping information to a forwarding table 212, which may be too large to be stored in the cache memory 204. The network flow information may include information such as, for example, a flow identifier and a flow tuple (e.g., a source IP address, a source port number, a destination IP address, a destination port number, and a protocol) corresponding to a particular network flow. It should be appreciated that the network flow information may include any other type or combination of information corresponding to a particular network flow. In some embodiments, a network controller (not shown), such as a software defined network (SDN) controller, connected to the network devices 106 may define the flow (i.e., compute a route for the flow) and provide the defined flow for entry into the flow lookup table 206 for each network device 106 along the transmission path identified by the flow.

While the illustrative flow lookup table 206 is stored in the cache memory 204, in some embodiments, at least a portion of the flow lookup table 206 may be stored in the memory 210 (i.e., main memory) of the network device 106. Due to the latency associated with having to perform a lookup for the network flow information in the forwarding table 212 in the memory 210, key/value pairs may be stored in entries of the flow lookup table 206 (i.e., a hash table, or hash lookup table) that map input values (e.g., data related to received network packets) to forwarding table entries of the forwarding table 212.

The data storage device 214 may be embodied as any type of device or devices configured for short-term or long-term storage of data such as, for example, memory devices and circuits, memory cards, hard disk drives, solid-state drives, or other data storage devices. In some embodiments, the data storage device 214 may be used to store the contents of one or more trusted execution environments. When stored by the data storage device 214, the contents of the trusted execution environments may be encrypted to prevent access by unauthorized software.

The communication circuitry 216 may be embodied as any communication circuit, device, or collection thereof, capable of enabling communications over the network 104 between network device 106 and the computing device 102, another network device 106, and/or the remote computing device 108. The communication circuitry 216 may be configured to use any one or more communication technologies (e.g., wired or wireless communications) and associated protocols (e.g., Ethernet, Bluetooth®, Wi-Fi®, WiMAX, etc.) to effect such communication. The illustrative communication circuitry 216 additionally includes a network interface card (NIC) 218. The NIC 218 may connect the network device 106 to the computing device 102, another network device 106, or the remote computing device 108. The NIC 218 may be embodied as one or more add-in-boards, daughtercards, network interface cards, controller chips, chipsets, or other devices that may be used by the network device 106. For example, the NIC 218 may be embodied as an expansion card coupled to the I/O subsystem 208 over an expansion bus, such as PCI Express.

Figure 3:
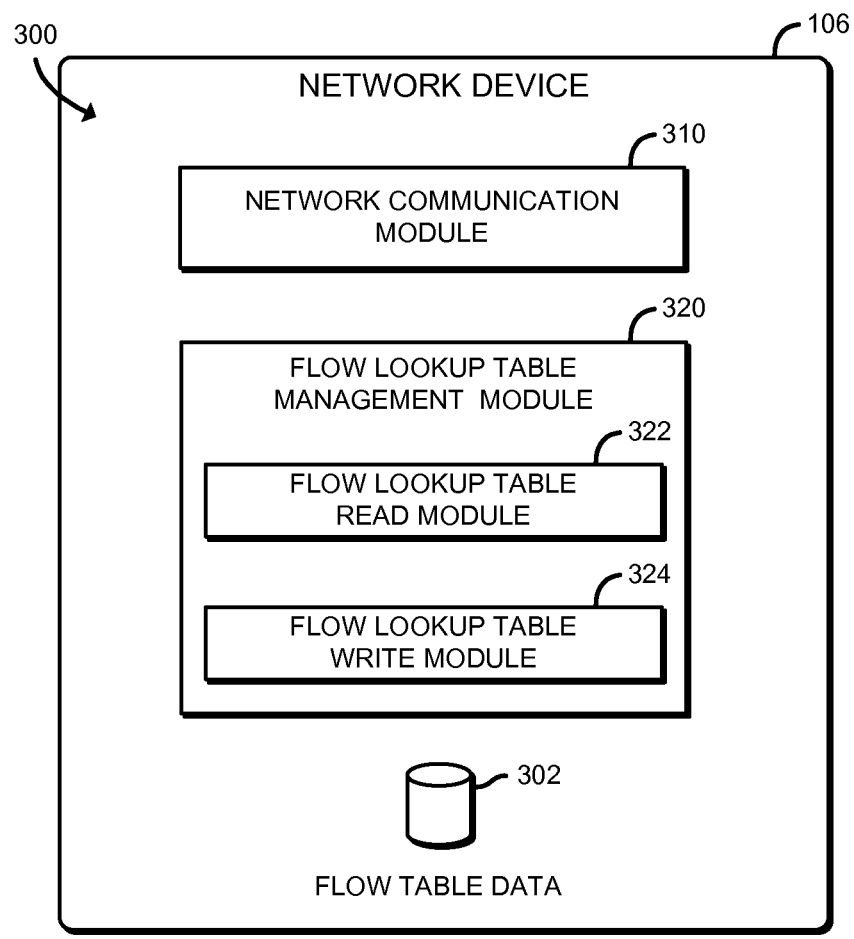
FIG. 3 is a simplified block diagram of at least one embodiment of an environment of the network device of FIG. 2.

Referring now to FIG. 3, in use, the network device 106 establishes an environment 300 during operation. In the illustrative environment 300, the network device 106 includes a network communication module 310 and a flow lookup table management module 320. The illustrative environment 300 additionally includes flow lookup table data 302 that may include network flow related information. The various modules of the environment 300 may be embodied as hardware, firmware, software, or a combination thereof. For example, the various modules, logic, and other components of the environment 300 may form a portion of, or otherwise be established by, the processor 202 or other hardware components of the network device 106. As such, in some embodiments, any one or more of the modules of the environment 300 may be embodied as a circuit or collection of electrical devices (e.g., a network communication circuit, a flow lookup table management circuit, etc.). Additionally or alternatively, in some embodiments, one or more of the illustrative modules may form a portion of another module and/or one or more of the illustrative modules and/or submodules may be embodied as a standalone or independent module.

The network communication module 310 is configured to facilitate network communications between the network device 106 and a target computing device (e.g., another network device 106, the remote computing device 108, etc.). In other words, the network communication module 310 is configured to receive and process network packets received by the network device 106 and to prepare and transmit network packets from the network device 106. Accordingly, at least a portion of the functionality of the network communication module 310 may be performed by the communication circuitry 216, and more specifically by the NIC 218. Additionally, the network communication module 310 may process received network packets by parsing at least a portion of the network packet to determine network flow information (e.g., 5-tuple flow identification, a source IP/MAC/port, a destination IP/MAC/port, etc.) of the received network packet and/or prepare a network packet for transmission by updating the network packet with updated network flow information.

The flow lookup table management module 320 is configured to manage the flow lookup table data 302 of a flow lookup table (e.g., the flow lookup table 206 of FIG. 1). As described previously, the flow lookup table 206 includes of a number of buckets that each includes one or more key/value pairs and a corresponding version counter. The flow lookup table management module 320 includes a flow lookup table read module 322 and a flow lookup table write module 324 to support concurrent reading from and writing to a flow lookup table.

Figure 5:
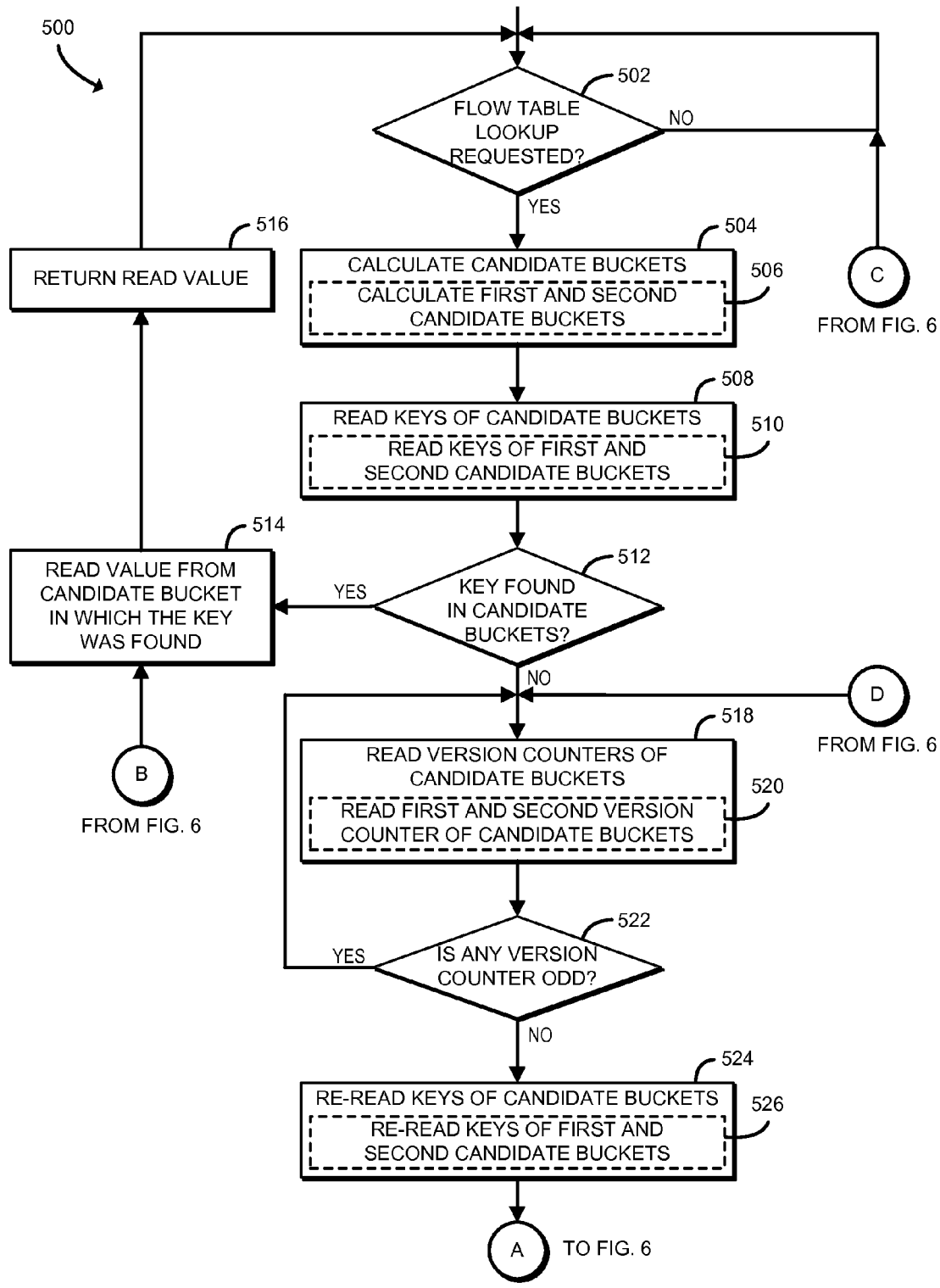
FIGS. 5 and 6 is a simplified flow diagram of another embodiment of a method for performing a flow lookup table lookup that may be executed by the network device of FIG. 2.

The flow lookup table read module 322 is configured to perform read operations on the flow lookup table to read from the flow lookup table data 302. The flow lookup table read module 322 may be configured to perform a lookup on the flow lookup table data 302, an embodiment of which is shown in FIG. 5. In some embodiments, the flow lookup table read module 322 may be configured to perform multiple read operations in parallel without the need for any locks or mutexes. As described previously, a version counter may be associated with each hash table bucket based on the structure of the flow lookup table (e.g., a way-number of a way-association of the flow lookup table). Unlike traditional read/write conflict detection methods that require comparing the version counter pre- and post-read operation, the flow lookup table read module 322 only performs the version counter comparison after a read operation if the key of the key/value pair was not found in the expected location, or bucket, in the flow lookup table 206 during the read/lookup operation.

Figure 7:
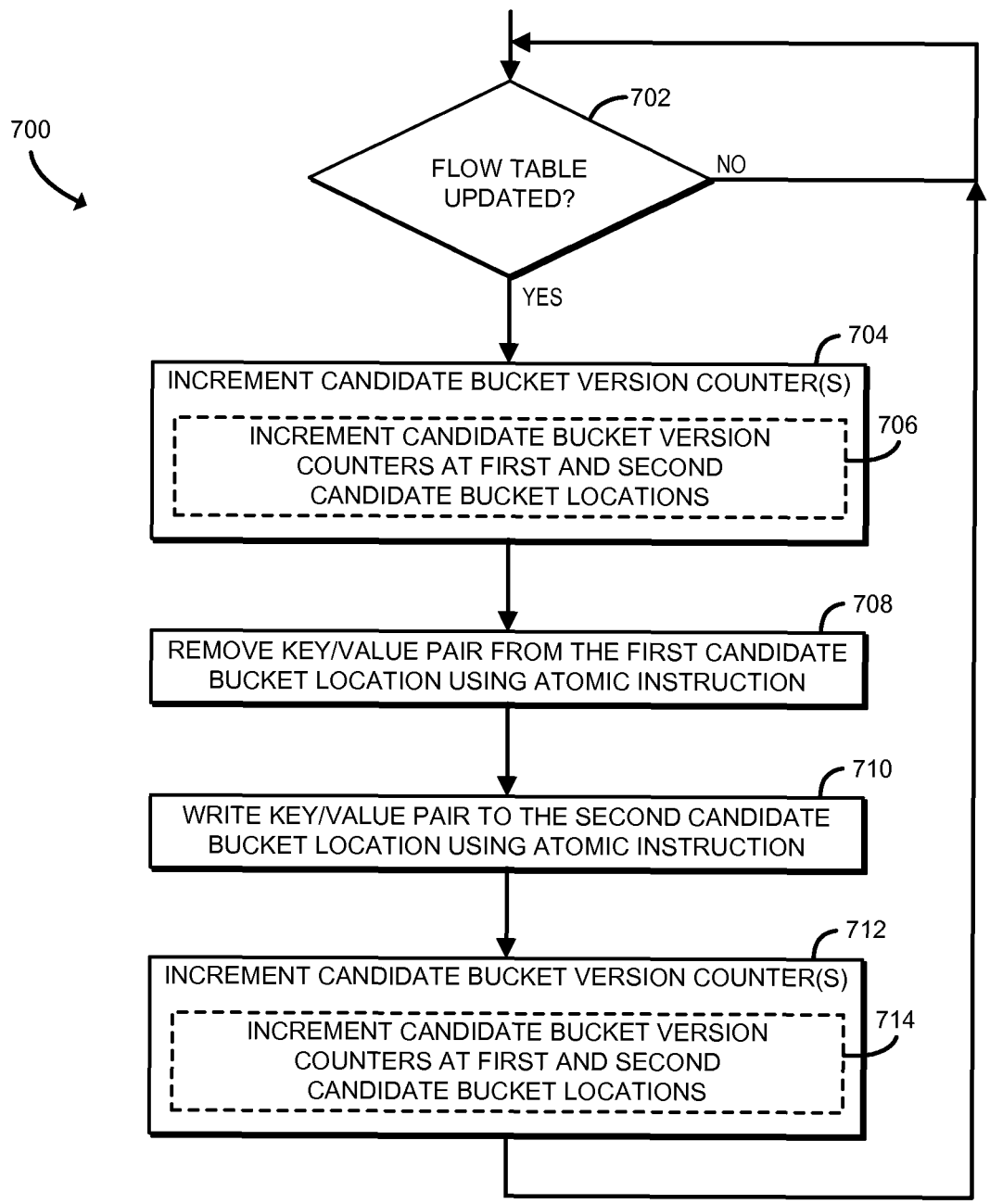
FIG. 7 is a simplified flow diagram of at least one embodiment of a method for an atomic displacement operation of a key/value pair of a flow lookup table supporting read-write concurrency that may be executed by the network device of FIG. 2.

The flow lookup table write module 324 is configured to perform write operations on the flow lookup table to write to flow lookup table data 302. The flow lookup table write module 324 may be further configured to perform a displacement process, as shown in FIG. 7, when updating or inserting key/value pairs into the flow lookup table data 302. The flow lookup table write module 324 increments the version counter each time the flow lookup table write module 324 accesses a bucket for modification, and against when the flow lookup table write module 324 modifies the bucket.

In some embodiments, the overhead associated with the version counter check and comparison may be reduced by using intrinsic load and store instructions based on the architecture of the processor 202 of the network device 106. For example, in an Intel® Architecture (IA) embodiment, the IA intrinsic instructions may include "mm_load" to read the key and "mm_store" to write the key. Additionally, to support atomic operation, a key/value pair may be stored in a single cache-aligned data structure, based on a size of the entries of the flow lookup table. For example, if a size of an entry in the flow lookup table data 302 is equal to 16 bytes, the single cache-aligned data structure may have a size of less than or equal to 16 bytes. As a result, the flow lookup table write module 324 may displace the key/value pair in a single operation, rather than one write operation for the key and another write operation for the value. Accordingly, if a key/value pair is found (i.e., read by the flow lookup table read module 322) in the flow lookup table, the value associated with a found key may be presumed to be valid. In other words, if the key/value pair is found in the flow lookup table, it can be presumed that it is not in the process of being updated.

Figure 4:
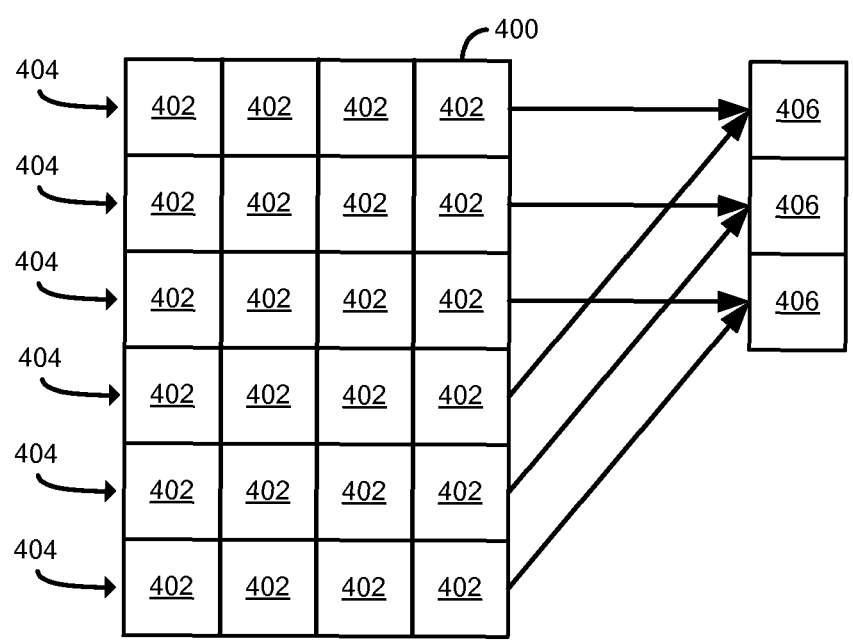
FIG. 4 is a simplified illustration of at least one embodiment of a two-way function, four-way association Cuckoo hash table that may be used by the network device of FIG. 2.

Referring now to FIG. 4, an illustrative Cuckoo hash table 400 is embodied as a set-associative hash flow lookup table that supports mapping buckets 404 (i.e., multiple entries) to one or more entries 402 for storing key/value pairs. The illustrative Cuckoo hash table 400 is a two-way function, four-way association Cuckoo hash table that includes a number of buckets 404 that each include four entries 402 for storing key/value pairs. Additionally, each bucket 404 is mapped to a corresponding version counter 406. While each version counter of the version counters 406 in the illustrative Cuckoo hash table 400 is shown as corresponding to more than one of the buckets 404, it should be appreciate that, in some embodiments, each of the version counters 406 may only correspond to one of the buckets 404 (i.e., each bucket 404 may have its own version counter 406). Additionally, while a four-way set-associative hash table is shown in the illustrative embodiment, it should be appreciated that an alternative set-associative hash table may be used.

Referring now to FIG. 5, in use, a network device 106 may execute a method 500 for performing a lookup at a flow lookup table. The method 500 begins with block 502, in which the network device 106 determines whether a lookup of a flow lookup table (e.g., the flow lookup table 206 of FIG. 2) has been requested. If not, the method loops back to block 502 to continue determining whether the flow lookup table 206 lookup was requested. It should be appreciated that, in some embodiments, the method 500 does not function as a polling method (i.e., sampling at predetermined time intervals), and the method 500 may be initialized (i.e., started) upon receipt of a message, or notification, that indicates a flow lookup table lookup has been requested. If the network device 106 determines the flow lookup table 206 lookup has been requested (e.g., via polling or receiving a message), the method advances to block 504.

At block 504, the network device 106 calculates candidate buckets for an identifier (e.g., a destination IP address, a 5-tuple flow identification, a destination MAC address, etc.) associated with the lookup request. To do so, the network device 106 may apply different hashing functions to the identifier, wherein each candidate bucket corresponds to a different candidate bucket based on a different hash function. Accordingly, each identifier may be mapped to multiple candidate buckets and each of the candidate buckets may be based on different hash functions. For example, the Cuckoo hash table 400 of FIG. 4 (i.e., two-way function, four-way association) includes two candidate buckets for entry of a key/value pair in the Cuckoo hash table 400. Accordingly, in such a two candidate bucket embodiment, at block 506, the network device 106 calculates a first candidate bucket by applying a first hash to the key and a second candidate bucket by applying a second hash to the key. At block 508, the network device 106 reads the keys for each of the candidate buckets calculated at block 504. In the illustrative embodiment, at block 510, the network device 106 reads the keys of the first and second candidate buckets. At block 512, the network device 106 determines whether the key was found in any of the candidate buckets read at block 508. In the illustrative embodiment, the network device 106 determines whether the key was found in either of the first or second candidate buckets calculated at block 506 and read at block 510.

If the network device 106 determines the key was found in any candidate bucket read at block 508, the method 500 advances to block 514, in which the value is read from the candidate bucket that corresponds to the candidate bucket in which the key was found before the method 500 advances to block 516. At block 516, the method 500 returns the value read at block 514, before looping back to block 502, wherein the method 500 resumes determining whether a lookup of the flow lookup table 206 was requested. However, if the network device 106 determines the key was not found in any of the candidate buckets at block 512, the method 500 advances to block 518.

At block 518, the network device 106 reads the version counters of each of the candidate buckets calculated at block 504. Accordingly, in the illustrative embodiment, at block 520, the network device 106 reads the first and second version counters corresponding to the first and second version counters of the candidate buckets calculated at block 506. At block 522, the network device 106 determines whether any of the version counters read at block 518 are odd. If any of the version counters are odd, the method 500 loops back to block 518 to read the version counters again. Such a condition may indicate that a displacement is presently occurring, such as the atomic displacement operation described below in FIG. 7. In other words, the key may be being moved from one bucket to another, and the key may have been deleted from one bucket, but not yet added to another. Accordingly, the method 500 may continue to check the version counters (i.e., at block 522) and continue to loop back to block 518 until all the version counters read at block 518 are even.

Figure 6:
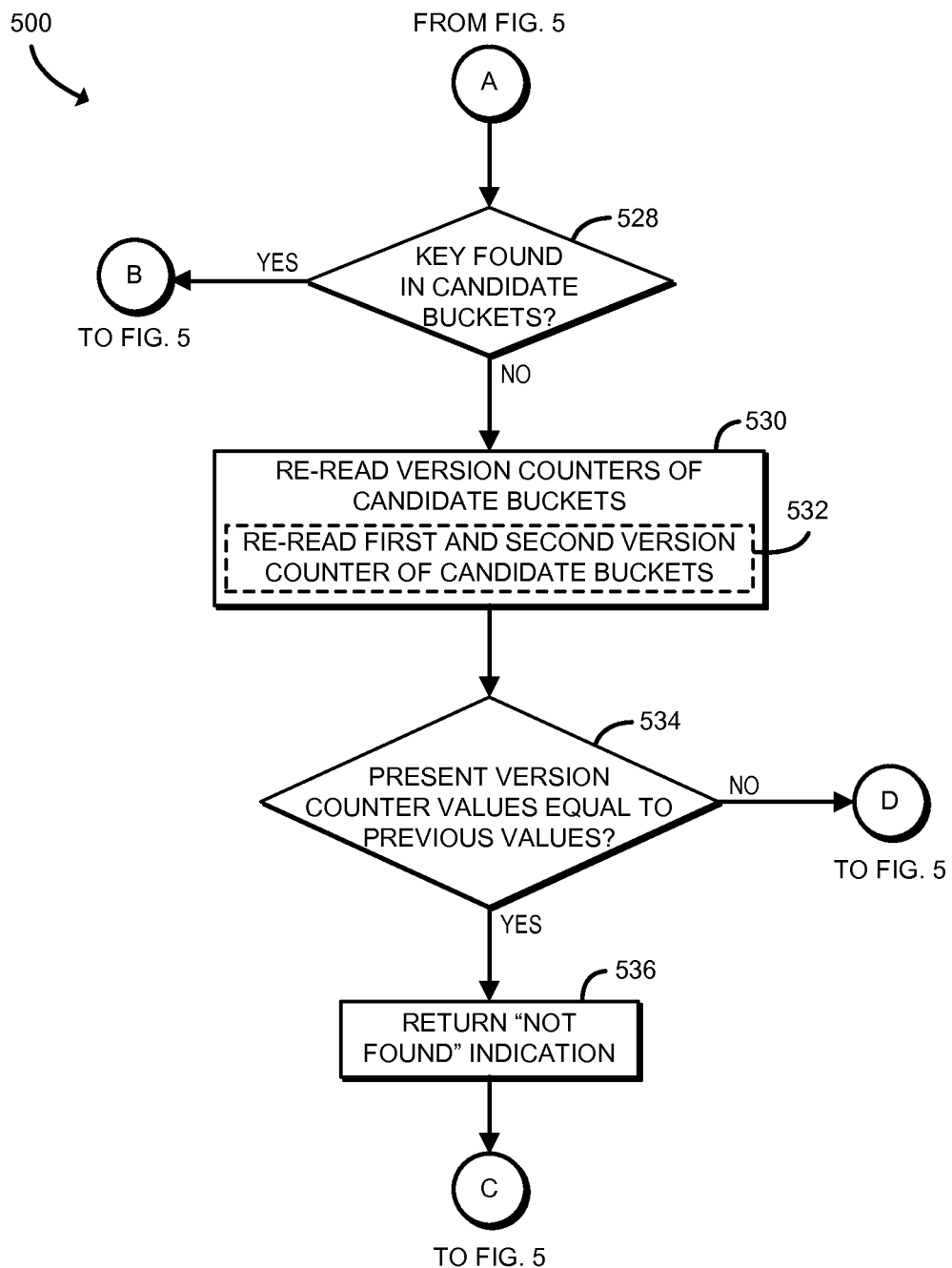

If the network device 106 determines, at block 522, that both of the version counters are even, the method 500 advances to block 524. Similar to block 508, at block 524, the network device 106 re-reads the keys for each of the candidate buckets calculated at block 504. In the two candidate bucket embodiment, at block 526, the network device 106 re-reads the keys of the first and second candidate buckets before the method 500 advances to block 528. At block 528, as shown in FIG. 6, the network device 106 determines whether the key was found in any of the candidate buckets read at block 524. In the two candidate bucket embodiment, the network device 106 determines whether the key was found in either of the first or second candidate buckets calculated at block 506 and read at block 526.

If the key was found in any of the candidate buckets at block 528, the method 500 advances to block 514, wherein the value is read from the candidate bucket that corresponds to the candidate bucket in which the key was found. If the key was not found, the method 500 advances to block 530, wherein the network device 106 re-reads the version counters of the candidate buckets. In the illustrative embodiment, at block 532, the network device 106 re-reads the version counters of the first and second candidate buckets before proceeding to block 534. At block 534, the network device 106 determines whether the present version counter value re-read at block 530 is equal to the previous version counter value read at block 518. If not, the method 500 returns to block 518 to read the version counters of the candidate buckets calculated at block 504. If the present version counter value re-read at block 630 are equal to the previous version counter value read at block 518, the network device 106 returns an indication that the key was "not found" before proceeding back to block 502 to resume determining whether a flow lookup table lookup was requested.

Referring now to FIG. 7, in use, a network device 106 may execute a method 700 for an atomic displacement operation of a key/value pair of a flow lookup table that supports read-write concurrency, such as the flow lookup table 206 of FIG. 1. As described above, the network device 106 calculates candidate buckets for a flow identifier (e.g., a destination IP address, a 5-tuple flow identification, a destination MAC address, etc.), wherein the candidate bucket includes one or more key/value entries. As a byproduct of hashing and storing a key/value pair in one of the candidate bucket entries, an existing key/value entry may be relocated to an alternate candidate bucket. Such a relocation, or displacement, may occur multiple times during a single key/value pair insertion.

The method 700 begins with block 702, in which the network device 106 determines whether the flow lookup table 206 has been updated. If not, the method loops back to block 702 to continue determining whether the flow lookup table 206 has been updated. It should be appreciated that, in some embodiments, the method 700 does not function as a polling method (i.e., sampling at predetermined time intervals), and the method 700 may be initialized (i.e., started) upon receipt of a message, or notification, that indicates which flow entry of the flow lookup table 206 has been updated. If the network device 106 determines the flow lookup table 206 was updated (e.g., via polling or receiving a message), the method advances to block 704.

At block 704, the network device 106 increments any version counters mapped to candidate buckets that correspond to the updated flow entry. For example, the Cuckoo hash table 400 of FIG. 4 includes two candidate buckets for each key. In such an embodiment, the network device 106, at block 706, increments a version counter corresponding to a first candidate bucket and a version counter corresponding to a second candidate bucket. At block 708, the network device 106 removes the key/value pair from the first candidate bucket using an atomic instruction. At block 710, the network device 106 writes the key/value pair to the second candidate bucket using an atomic instruction. In other words, instead of a normal write operation, an intrinsic instruction may be used, such as "mm_store", to write the key to the corresponding candidate bucket (i.e., the second candidate bucket) for displacement. As noted previously, as a result of the atomicity of the instruction, a found key in either candidate bucket may indicate a valid value. At block 712, the network device 106 again increments any bucket version counters that correspond to the updated flow entry. In an embodiment that includes two candidate buckets for entry of a key/value pair (e.g., the Cuckoo hash table 400 of FIG. 4), at block 714, the network device 106 again increments the version counter of the first candidate bucket and the version counter of the second candidate bucket.

EXAMPLES

Illustrative examples of the devices, systems, and methods disclosed herein are provided below. An embodiment of the devices, systems, and methods may include any one or more, and any combination of, the examples described below.

Example 1 includes a network device to support concurrency of a flow lookup table, the network device comprising a cache memory associated with a processor of the network device, the cache memory to store a flow lookup table that includes a plurality of entries and a plurality of candidate buckets, wherein each candidate bucket is mapped to a version counter and includes one or more of the plurality of entries to store key/value pairs that map to a flow of a network packet, and wherein the plurality of candidate buckets comprises a first candidate bucket mapped to a first version counter and a second candidate bucket is mapped to a second version counter; a flow lookup table write module to perform a displacement operation of a key/value pair via an atomic instruction to move the key/value pair from the first candidate bucket to the second candidate bucket in response to a determination that the key/value pair is to be one of updated in the flow lookup table or inserted into the flow lookup table; and a flow lookup table read module to perform a lookup operation on the flow lookup table.

Example 2 includes the subject matter of Example 1, and wherein the flow lookup table comprises a set-associative hash flow lookup table that maps a key to each of the plurality of candidate buckets.

Example 3 includes the subject matter of any of Examples 1 and 2, and wherein the set-associative hash flow lookup table comprises a set-associative Cuckoo hash table.

Example 4 includes the subject matter of any of Examples 1-3, and wherein the set-associative Cuckoo hash table comprises a two-way function, four-way association Cuckoo hash table.

Example 5 includes the subject matter of any of Examples 1-4, and wherein the key/value pair comprises a single cache-aligned data structure having a size less than or equal to a size of one of the plurality of entries.

Example 6 includes the subject matter of any of Examples 1-5, and wherein the first candidate bucket is determined based on a first hash function that is applied to a flow identifier and the second candidate bucket is determined based on a second hash function, different than the first hash function, which is applied to the flow identifier.

Example 7 includes the subject matter of any of Examples 1-6, and wherein to perform the displacement operation of the key/value pair comprises to (i) increase the first and second version counters, (ii) remove the key/value pair from the first candidate bucket, (iii) write the key/value to the second candidate bucket, and (iv) increase the first and second version counters.

Example 8 includes the subject matter of any of Examples 1-7, and wherein to perform the lookup operation comprises to (i) calculate the first and second candidate buckets for a key using more than one hash function, (ii) determine whether the key is in either of the first or second candidate buckets, and (iii) read a value from an entry corresponding to the key from the first candidate bucket in response to a determination that the key is in the first candidate bucket or read the value from an entry corresponding to the key from the second candidate bucket in response to a determination that the key is in the second candidate bucket.

Example 9 includes the subject matter of any of Examples 1-8, and wherein, in response to a determination that the key is not in either of the first or second candidate buckets, the lookup operation further comprises to (i) read the first and second version counters and (ii) determine whether one of the first or second version counters is odd.

Example 10 includes the subject matter of any of Examples 1-9, and wherein, in response to a determination that one of the first or second version counters is odd, the lookup operation further comprises to re-read the first and second version counters.

Example 11 includes the subject matter of any of Examples 1-10, and wherein, in response to a determination that neither of the first and second version counters is odd, the lookup operation further comprises to (i) determine whether either of the first or second candidate buckets includes the key and (ii) return the value corresponding to the key in response to a determination that the key is in either of the first or second candidate buckets.

Example 12 includes the subject matter of any of Examples 1-11, and wherein, in response to a determination that neither of the first and second version counters is odd, the lookup operation further comprises to (i) determine whether either of the first or second candidate buckets includes the key and (ii) return an indication that the key was not found in response to a determination that the key is not in either of the first or second candidate buckets.

Example 13 includes a method for supporting concurrency of a flow lookup table, the method comprising storing a flow lookup table that includes a plurality of entries and a plurality of candidate buckets, wherein each candidate bucket is mapped to a version counter and includes one or more of the plurality of entries to store key/value pairs that map to a flow of a network packet, wherein the plurality of candidate buckets comprises a first candidate bucket mapped to a first version counter and a second candidate bucket is mapped to a second version counter, and; performing a displacement operation of a key/value pair via an atomic instruction to move the key/value pair from the first candidate bucket to the second candidate bucket in response to a determination that the key/value pair is to be one of updated in the flow lookup table or inserted into the flow lookup table; and performing a lookup operation on the flow lookup table.

Example 14 includes the subject matter of Example 13, and wherein performing the lookup operation on the flow lookup table comprises performing the lookup operation on a set-associative hash flow lookup table that maps a key to each of the plurality of candidate buckets.

Example 15 includes the subject matter of any of Examples 13 and 14, and wherein performing the lookup operation on the flow lookup table comprises performing the lookup operation on a set-associative Cuckoo hash table.

Example 16 includes the subject matter of any of Examples 13-15, and wherein performing the lookup operation on the set-associative Cuckoo hash table comprises performing the lookup operation on a two-way function, four-way association Cuckoo hash table.

Example 17 includes the subject matter of any of Examples 13-16, and wherein performing the displacement operation of the key/value pair via the atomic instruction comprises performing the displacement operation of a single cache-aligned data structure having a size less than or equal to a size of one of the plurality of entries.

Example 18 includes the subject matter of any of Examples 13-17, and wherein the first candidate bucket is determined based on a first hash function that is applied to a flow identifier and the second candidate bucket is determined based on a second hash function, different than the first hash function, which is applied to the flow identifier.

Example 19 includes the subject matter of any of Examples 13-18, and wherein performing the displacement operation of the key/value pair comprises (i) increasing the first and second version counters, (ii) removing the key/value pair from the first candidate bucket, (iii) write the key/value to the second candidate bucket, and (iv) increasing the first and second version counters.

Example 20 includes the subject matter of any of Examples 13-19, and wherein performing the lookup operation comprises (i) calculating the first and second candidate buckets for a key using more than one hash function, (ii)

determining whether the key is in either of the first or second candidate buckets, and (iii) reading a value from an entry corresponding to the key from the first candidate bucket in response to a determination that the key is in the first candidate bucket or reading the value from an entry corresponding to the key from the second candidate bucket in response to a determination that the key is in the second candidate bucket.

Example 21 includes the subject matter of any of Examples 13-20, and wherein performing the lookup operation further comprises (i) reading the first and second version counters in response to a determination that the key is not in either of the first or second candidate buckets and (ii) determining whether one of the first or second version counters is odd.

Example 22 includes the subject matter of any of Examples 13-21, and wherein performing the lookup operation further comprises re-reading the first and second version counters of each of the first and second candidate buckets in response to a determination that one of the first or second version counters of either of the first or second candidate buckets is odd.

Example 23 includes the subject matter of any of Examples 13-22, and wherein performing the lookup operation further comprises (i) determining whether either of the first or second candidate buckets includes the key and (ii) returning the value corresponding to the key in response to a determination that the key is in either of the first or second candidate buckets.

Example 24 includes the subject matter of any of Examples 13-23, and wherein performing the lookup operation further comprises (i) determining whether either of the first or second candidate buckets includes the key and (ii) returning an indication that the key was not found in response to a determination that the key is not in either of the first or second candidate buckets.

Example 25 includes a computing device comprising a processor; and a memory having stored therein a plurality of instructions that when executed by the processor cause the computing device to perform the method of any of Examples 13-24.

Example 26 includes one or more machine readable storage media comprising a plurality of instructions stored thereon that in response to being executed result in a computing device performing the method of any of Examples 13-24.

Example 27 includes a computing device for supporting concurrency of a flow lookup table, the computing device comprising means for storing a flow lookup table that includes a plurality of entries and a plurality of candidate buckets, wherein each candidate bucket is mapped to a version counter and includes one or more of the plurality of entries to store key/value pairs that map to a flow of a network packet, and wherein the plurality of candidate buckets comprises a first candidate bucket mapped to a first version counter and a second candidate bucket is mapped to a second version counter; and means for performing a displacement operation of a key/value pair via an atomic instruction to move the key/value pair from the first candidate bucket to the second candidate bucket in response to a determination that the key/value pair is to be one of updated in the flow lookup table or inserted into the flow lookup table; and means for performing a lookup operation on the flow lookup table.

Example 28 includes the subject matter of Example 27, and wherein the means for performing the lookup operation on the flow lookup table comprises means for performing the lookup operation on a set-associative hash flow lookup table that maps a key to each of the plurality of candidate buckets.

Example 29 includes the subject matter of any of Examples 27 and 28, and wherein the means for performing the lookup operation on the flow lookup table comprises means for performing the lookup operation on a set-associative Cuckoo hash table.

Example 30 includes the subject matter of any of Examples 27-29, and wherein the means for performing the lookup operation on the set-associative Cuckoo hash table comprises means for performing the lookup operation on a two-way function, four-way association Cuckoo hash table.

Example 31 includes the subject matter of any of Examples 27-30, and wherein the means for performing the displacement operation of the key/value pair via the atomic instruction comprises means for performing the displacement operation of a single cache-aligned data structure having a size less than or equal to a size of one of the plurality of entries.

Example 32 includes the subject matter of any of Examples 27-31, and wherein the first candidate bucket is determined based on a first hash function that is applied to a flow identifier and the second candidate bucket is determined based on a second hash function, different than the first hash function, which is applied to the flow identifier.

Example 33 includes the subject matter of any of Examples 27-32, and wherein the means for performing the displacement operation of the key/value pair comprises means for (i) increasing the first and second version counters, (ii) removing the key/value pair from the first candidate bucket, (iii) writing the key/value to the second candidate bucket, and (iv) increasing the first and second version counters.

Example 34 includes the subject matter of any of Examples 27-33, and wherein the means for performing the lookup operation comprises means for (i) calculating the first and second candidate buckets for a key using more than one hash function, (ii) determining whether the key is in either of the first or second candidate buckets, and (iii) reading a value from an entry corresponding to the key from the first candidate bucket in response to a determination that the key is in the first candidate bucket or reading the value from an entry corresponding to the key from the second candidate bucket in response to a determination that the key is in the second candidate bucket.

Example 35 includes the subject matter of any of Examples 27-34, and wherein the means for performing the lookup operation further comprises means for (i) reading the first and second version counters in response to a determination that the key is not in either of the first or second candidate buckets and (ii) determining whether one of the first or second version counters is odd.

Example 36 includes the subject matter of any of Examples 27-35, and wherein the means for performing the lookup operation further comprises means for re-reading the first and second version counters of each of the first and second candidate buckets in response to a determination that one of the first or second version counters is odd.

Example 37 includes the subject matter of any of Examples 27-36, and wherein the means for performing the lookup operation further comprises means for (i) determining whether either of the first or second candidate buckets includes the key and (ii) returning the value corresponding to the key in response to a determination that the key is in either of the first or second candidate buckets.

Example 38 includes the subject matter of any of Examples 27-37, and wherein the means for performing the lookup operation further comprises means for (i) determining whether either of the first or second candidate buckets includes the key and (ii) returning an indication that the key was not found in response to a determination that the key is not in either of the first or second candidate buckets.

The invention claimed is:

1. A network device to support concurrency of a flow lookup table, the network device comprising:
   one or more processors;
   a cache memory communicatively coupled to the one or more processors of the network device, the cache memory to store a flow lookup table that includes a plurality of entries and a plurality of candidate buckets, wherein each candidate bucket is mapped to a version counter and includes one or more of the plurality of entries to store key/value pairs that map to flows of network packets, and wherein the plurality of candidate buckets comprises a first candidate bucket mapped to a first version counter and a second candidate bucket mapped to a second version counter; and
   one or more memory devices having stored therein a plurality of instructions that, when executed by the one or more processors, causes the network device to:
      perform a displacement operation of a key/value pair via an atomic instruction to move the key/value pair from the first candidate bucket to the second candidate bucket in response to a determination that the key/value pair is to be at least one of (i) updated in the flow lookup table or (ii) inserted into the flow lookup table;
      receive a network packet from a source computing device;
      perform a lookup operation on the flow lookup table based on information included in the network packet;
      determine a target computing device based on the lookup operation; and
      send the network packet to the target computing device.

2. The network device of claim 1, wherein the flow lookup table comprises a set-associative hash flow lookup table that maps a key to each of the plurality of candidate buckets.

3. The network device of claim 2, wherein the set-associative hash flow lookup table comprises a set-associative Cuckoo hash table.

4. The network device of claim 1, wherein the key/value pair comprises a single cache-aligned data structure having a size less than or equal to a size of one of the plurality of entries.

5. The network device of claim 1, wherein the first candidate bucket is determined based on a first hash function that is applied to a flow identifier and the second candidate bucket is determined based on a second hash function, different than the first hash function, which is applied to the flow identifier.

6. The network device of claim 1, wherein to perform the displacement operation of the key/value pair comprises to (i) increase the first and second version counters, (ii) remove the key/value pair from the first candidate bucket, (iii) write the key/value to the second candidate bucket, and (iv) increase the first and second version counters.

7. The network device of claim 1, wherein to perform the lookup operation comprises to (i) calculate the first and second candidate buckets for a key using more than one hash function, (ii) determine whether the key is in either of the first or second candidate buckets, and (iii) read a value from an entry corresponding to the key from the first candidate bucket in response to a determination that the key is in the first candidate bucket or read the value from an entry corresponding to the key from the second candidate bucket in response to a determination that the key is in the second candidate bucket.

8. The network device of claim 7, wherein, in response to a determination that the key is not in either of the first or second candidate buckets, the lookup operation further comprises to (i) read the first and second version counters and (ii) determine whether one of the first or second version counters is odd.

9. The network device of claim 8, wherein, in response to a determination that one of the first or second version counters is odd, the lookup operation further comprises to re-read the first and second version counters.

10. The network device of claim 9, wherein, in response to a determination that neither of the first and second version counters is odd, the lookup operation further comprises to (i) determine whether either of the first or second candidate buckets includes the key and (ii) return the value corresponding to the key in response to a determination that the key is in either of the first or second candidate buckets.

11. The network device of claim 9, wherein, in response to a determination that neither of the first and second version counters is odd, the lookup operation further comprises to (i) determine whether either of the first or second candidate buckets includes the key and (ii) return an indication that the key was not found in response to a determination that the key is not in either of the first or second candidate buckets.

12. One or more computer-readable storage media comprising a plurality of instructions stored thereon that in response to being executed cause a computing device to:
   store a flow lookup table that includes a plurality of entries and a plurality of candidate buckets, wherein each candidate bucket is mapped to a version counter and includes one or more of the plurality of entries to store key/value pairs that map to flows of network packets, and wherein the plurality of candidate buckets comprises a first candidate bucket mapped to a first version counter and a second candidate bucket mapped to a second version counter;
   perform a displacement operation of a key/value pair via an atomic instruction to move the key/value pair from the first candidate bucket to the second candidate bucket in response to a determination that the key/value pair is to be at least one of (i) updated in the flow lookup table or (ii) inserted into the flow lookup table;
   receive a network packet from a source computing device;
   perform a lookup operation on the flow lookup table based on information included in the network packet;
   determine a target computing device based on the lookup operation; and
   send the network packet to the target computing device.

13. The one or more computer-readable storage media of claim 12, wherein to perform the lookup operation on the flow lookup table comprises to perform the lookup operation on a set-associative hash flow lookup table that maps a key to each of the plurality of candidate buckets.

14. The one or more computer-readable storage media of claim 13, wherein to perform the lookup operation on the flow lookup table comprises to perform the lookup operation on a set-associative Cuckoo hash table.

15. The one or more computer-readable storage media of claim 12, wherein to perform the displacement operation of the key/value pair via the atomic instruction comprises to perform the displacement operation of a single cache-aligned data structure having a size less than or equal to a size of one of the plurality of entries.

16. The one or more computer-readable storage media of claim 12, wherein the first candidate bucket is determined based on a first hash function that is applied to a flow identifier and the second candidate bucket is determined based on a second hash function, different than the first hash function, which is applied to the flow identifier.

17. The one or more computer-readable storage media of claim 12, wherein to perform the displacement operation of the key/value pair comprises to (i) increase the first and second version counters, (ii) remove the key/value pair from the first candidate bucket, (iii) write the key/value to the second candidate bucket, and (iv) increase the first and second version counters.

18. The one or more computer-readable storage media of claim 12, wherein to perform the lookup operation comprises to (i) calculate the first and second candidate buckets for a key using more than one hash function, (ii) determine whether the key is in either of the first or second candidate buckets, and (iii) read a value from an entry corresponding to the key from the first candidate bucket in response to a determination that the key is in the first candidate bucket or read the value from an entry corresponding to the key from the second candidate bucket in response to a determination that the key is in the second candidate bucket.

19. The one or more computer-readable storage media of claim 18, wherein to perform the lookup operation further comprises to (i) read the first and second version counters in response to a determination that the key is not in either of the first or second candidate buckets and (ii) determine whether one of the first or second version counters is odd.

20. The one or more computer-readable storage media of claim 19, wherein to perform the lookup operation further comprises to re-read the first and second version counters of each of the first and second candidate buckets in response to a determination that one of the first or second version counters of either of the first or second candidate buckets is odd.

21. The one or more computer-readable storage media of claim 20, wherein to perform the lookup operation further comprises to (i) determine whether either of the first or second candidate buckets includes the key and (ii) return the value corresponding to the key in response to a determination that the key is in either of the first or second candidate buckets.

22. The one or more computer-readable storage media of claim 21, wherein to perform the lookup operation further comprises to (i) determine whether either of the first or second candidate buckets includes the key and (ii) return an indication that the key was not found in response to a determination that the key is not in either of the first or second candidate buckets.

23. A method for supporting concurrency of a flow lookup table, the method comprising:
   storing a flow lookup table that includes a plurality of entries and a plurality of candidate buckets, wherein each candidate bucket is mapped to a version counter and includes one or more of the plurality of entries to store key/value pairs that map to flows of network packets, wherein the plurality of candidate buckets comprises a first candidate bucket mapped to a first version counter and a second candidate bucket mapped to a second version counter, and;
   performing a displacement operation of a key/value pair via an atomic instruction to move the key/value pair from the first candidate bucket to the second candidate bucket in response to a determination that the key/value pair is to be at least one of (i) updated in the flow lookup table or (ii) inserted into the flow lookup table;
   receiving a network packet from a source computing device;
   performing a lookup operation on the flow lookup table based on information included in the network packet;
   determining a target computing device based on the lookup operation; and
   sending the network packet to the target computing device.

24. The method of claim 23, wherein performing the displacement operation of the key/value pair comprises (i) increasing the first and second version counters, (ii) removing the key/value pair from the first candidate bucket, (iii) writing the key/value to the second candidate bucket, and (iv) increasing the first and second version counters.

25. The method of claim 23, wherein performing the lookup operation comprises (i) calculating the first and second candidate buckets for a key using more than one hash function, (ii) determining whether the key is in either of the first or second candidate buckets, (iii) reading a value from an entry corresponding to the key from the first candidate bucket in response to a determination that the key is in the first candidate bucket or reading the value from an entry corresponding to the key from the second candidate bucket in response to a determination that the key is in the second candidate bucket, and (iv) returning the value.

* * * * *